Sept. 20, 1971 MITSUO IWATA 3,606,204

OPERATION CHANGING DEVICE FOR MAGNETIC RECORDING AND REPRODUCING APPARATUS

Filed May 23, 1969 2 Sheets-Sheet 1

Sept. 20, 1971 MITSUO IWATA 3,606,204

OPERATION CHANGING DEVICE FOR MAGNETIC RECORDING AND REPRODUCING APPARATUS

Filed May 23, 1969 2 Sheets-Sheet 2

United States Patent Office 3,606,204

Patented Sept. 20, 1971

3,606,204

OPERATION CHANGING DEVICE FOR MAGNETIC RECORDING AND REPRODUCING APPARATUS

Mitsuo Iwata, Yokohama, Japan, assignor to Victor Company of Japan, Limited, Yokohama, Japan Filed May 23, 1969, Ser. No. 827,184
Claims priority, application Japan, May 25, 1968, 43/35,081; Feb. 14, 1969, 44/10,508
Int. Cl. B11b *15/32;* G03b *1/04*
U.S. Cl. 242—201 8 Claims

ABSTRACT OF THE DISCLOSURE

An operation changing device for magnetic recording and reproducing apparatus including vertically rotatable arms having oppositely aligned free end portions, a connecting rod connected between the free ends of the arms, take-up disks vertically movable in response to the rotation of the arms, a string, one end of which is secured to a rotatable arm for rotating the arm by its movement, and a means for changing the direction of displacement of the string from vertical to horizontal. The take-up disks are thus adapted to move simultaneously and vertically by horizontal movement of the string.

The present invention relates to an operation changing device for magnetic recording and reproducing apparatus, and more particularly to an operation changing device adapted for changing its operative force of an optional horizontal direction into a force in a vertical direction to thereby simultaneously operate two take-up disks which are individually provided at two separate positions.

Heretofore there has been proposed an operation changing device having a number of metal plate levers coupled together. The conventional device required many parts which result in a large mechanical loss for operation and use of an extremely large operational power source. Furthermore, there was difficulty in that a reproducible and accurate displacement was not ensured for both movable members due to an accumulation of small errors in dimensions of the parts when these were assembled together.

The present invention is therefore to overcome such drawbacks as encountered in the conventional operation changing device.

The primary object of the present invention is to provide a simple operation changing device for magnetic recording and reproducing apparatus which changes an operative force in a horizontal direction to a force in a vertical direction as desired to thereby simultaneously and vertically move a plurality of movable members mutually separately provided.

Another object of the invention is to provide an operation changing device for magnetic recording and reproducing apparatus which requires fewer parts, has a low mechanical loss and is capable of changing an operative force effectively in a direction as desired by a small power source.

Further object of the invention is to provide an operation changing device for magnetic recording and reproducing apparatus that can afford a reproducible and accurate amount of displacement for a plurality of movable members.

Still another object of the invention is to provide an operation changing device for magnetic recording and reproducing apparatus which is capable of moving two take-up disks of reel drums respectively for a supply reel and a take-up reel simultaneously and vertically by a driving force of an optional horizontal direction.

Other objects and features of the present invention will be apparent from the following description with reference to the accompanying drawings, in which.

Figures 1, 2, 3, 4:
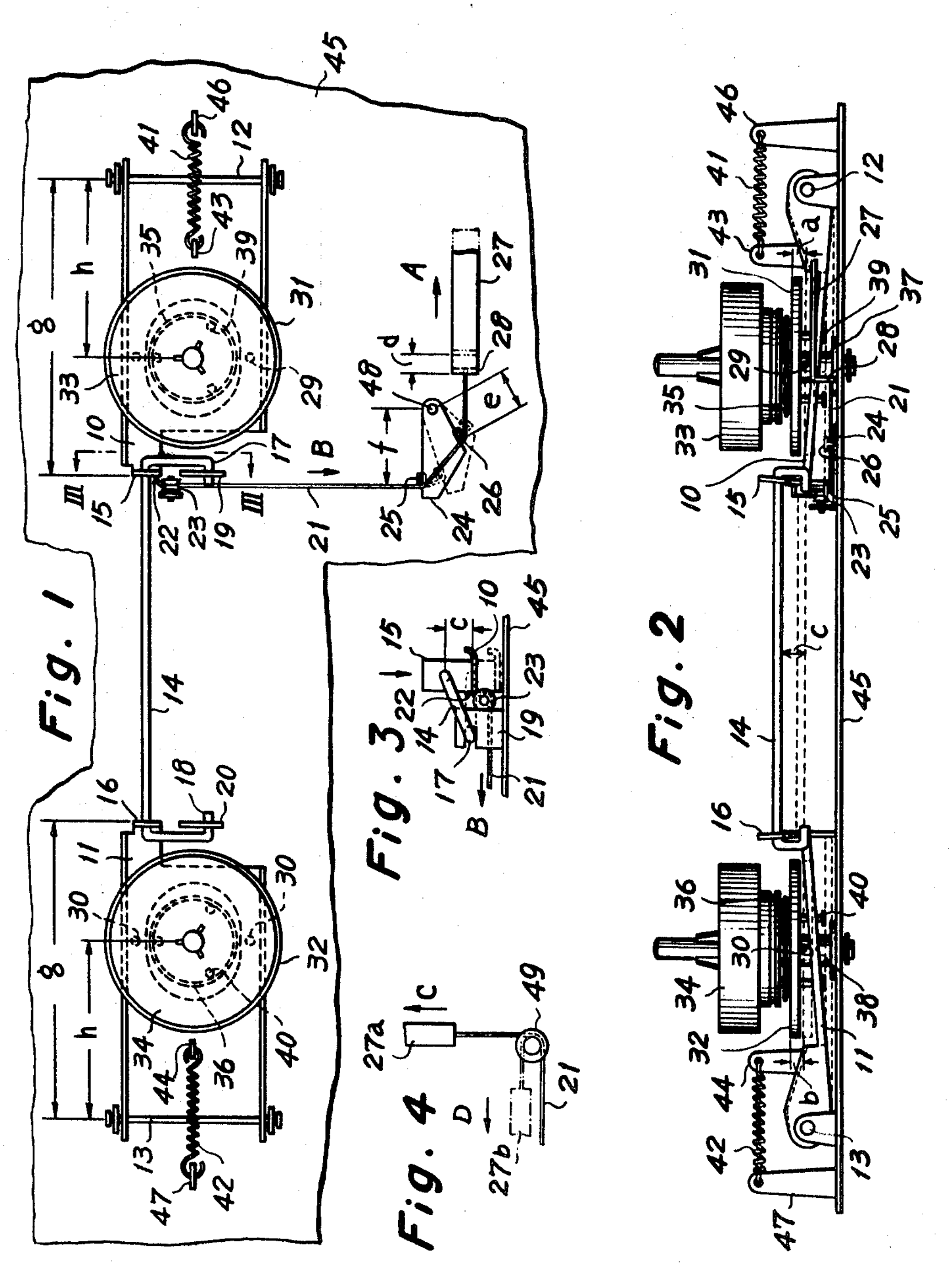
FIG. 1 is a plan view of an embodiment of the device according to the invention.
FIG. 2 is a side view of the device as shown in FIG. 1.
FIG. 3 is a vertical sectional view taken along the line III—III of FIG. 1.
FIG. 4 is a plan view of a modification of a part of the embodiment in FIG. 1.

In FIGS. 1 and 2, the first embodiment of the device according to the present invention is shown which is applied in an apparatus for reciprocal recording and reproduction. Rotatable arms 10 and 11 having free end portions in opposite alignment are respectively mounted on fixed shafts 12 and 13 to rotate in the vertical direction. Connecting rod 14 is fitted through holes on opposite free end portions 15 and 16 of the arms 10 and 11, movably in the lateral direction, bent portions 17 and 18 of the rod being carried rotatably by supports 19 and 20 positioned in alignment. Therefore, the rod 14 is rotatable about an axis connecting the supports 19 and 20.

Further there is provided a pulling string 21 having its one free end secured at a point 22 to the end portion 15 of the arm 10, which extends vertically and downwardly from the point 22 and is wound about a roller 23 approximately at an angle of 90° so that the direction of the string is changed to horizontal and then fastened on pins 25 and 26 mounted on a stroke adjusting lever 24. The other end of the string 21 is further secured at a point 28 on the forward end of a lever 27 which is coupled with an operation driving part.

Pivots 29 and 30 are respectively provided on the arms 10 and 11 and contact the lower surfaces of take-up disks 31 and 32. Reel drums 33, 34 on which reels are put are provided respectively on take-up disks 31 and 32 through compression spring 35 and 36 and rotatable about shafts 37 and 38. The reel drums 33 and 34 have respectively three shafts 39 and 40.

The above described take-up disks 31 and 32 are guided by said shafts 39 and 40 to make upward and downward movements and supported by pivots 29 and 30 being pushed by springs 35 and 36.

The arms 10 and 11 are urged to turn upwardly against the force of the springs 35 and 36 by tension springs 41 and 42 which are respectively extended between a projection 43 on the arm 10 and a projection 46 on a chassis base 45. The tension force of the springs 41 and 42 is stronger than the compression force of the springs 35 and 36. The string 21 overcoming the force of the tension springs 41 and 42 keeps the arms 10 and 11 in position through the lever 27.

The operation of the device of this invention will now be described in detail hereunder. The lever 27 is pulled in the direction of an arrow A by a distance $d$ for displacement whereby the string 21 between the pin 26 and the point 28 moves by the distance $d$ and the lever 24 turns round to a position as indicated by broken lines in FIG. 1. By turning movement of the lever 24, the string 21 in tension between the point 22 and the pin 25 is moved by a distance $(f/e)xd$ in the direction of an arrow B, hence the displacement $c$ of the point 22 of the arm 10 in the downward direction amounting to $$c=(f/e)xd$$

Herein $f$ represents the distance between a pivot shaft 48 and the pin 25 of the lever 24 and $e$ represents the distance between the pivot shaft 48 and the pin 26. Therefore, by preferred selection of the value of distances $e$ and $f$ corresponding to the amount of displacement $d$ of the lever 27, it will be possible to determine the amount of displacement $c$ of the arm 10 as desired. If dimensions of the lever 24 be determined by preferred selection of the value of distances $e$ and $f$ such that said amount of displacement $c$ may have a value as desired, it may consequently result that the arm 10 will move downwardly toward the chassis base 45 by the amount of displacement as desired and the arm 11 connected to the arm 10 by rod 14 will move downwardly by displacement in the same amount as provided for the arm 10.

In the same position as described above, the pivots 29 and 30 which are fixed by arms 10 and 11 will move downwardly to the amount of $(h/g)xc$, where $g$ represents the length from the pivot shafts 12 and 13 of the arms 10 and 11 to the opposite free end portions 15 and 16 into which the rod 14 is inserted and $h$ represents the length from the pivot shafts 12 and 13 to the pivots 29 and 30. The take-up disks 31 and 32 are therefore displaced downwardly by the force of the compression springs 35 and 36. If the amount of displacement of the take-up disks 31 and 32 be denoted as $a$ and $b$ respectively, a formula may be $$a=b=(h/g)xc=(h/g)x(h/e)xd$$

When the disks 31 and 32 are displaced downwardly to the positions as mentioned above, a rotation driving means (not shown) will directly contact the reel drums 33 and 34 so as to commence the fast forwarding of tape and when the disks 31 and 32 are positioned upwardly said rotation driving means will contact said disks 31 and 32 thereby effecting a normal running of tape for recording and reproducing.

When the lever 27 is released from the engagement for keeping displacement in the direction of arrow A, the arms 10 and 11 turn upwardly by force of the springs 41 and 42, while both reels disks 31 and 32 are returned to the initial position on the same level with each other.

As shown in FIG. 4, a roller 49 may be provided to change the direction of displacement of the string 21 and permit it to displace in the direction of an arrow C perpendicular to the arrow A by means of a lever 27$a$ as shown by solid lines. Or the string 21 may be displaced in the direction of an arrow D reverse to the direction of arrow A by a lever 27$b$ as shown by dot-chain lines or said roller 49 may be provided in plural number so as to actuate linearly from a desired direction.

Figure 5:
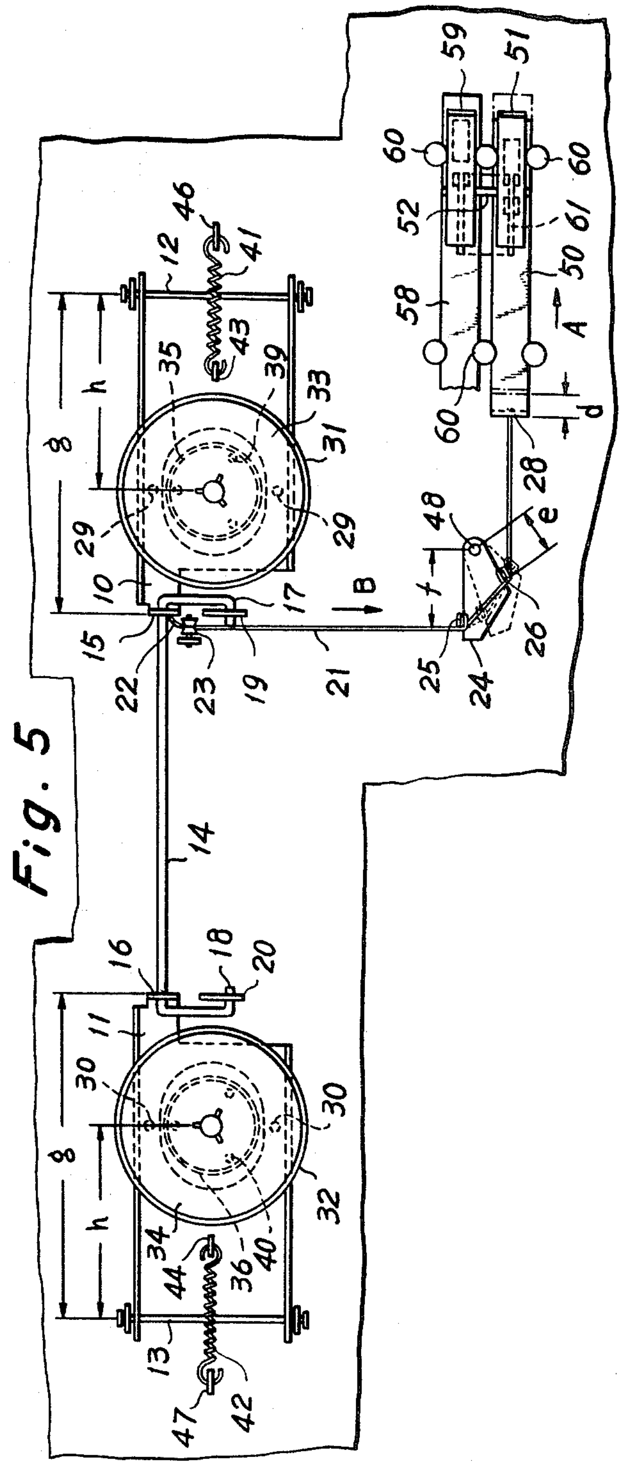
FIG. 5 is a plan view of another embodiment of the device according to the invention.
Figure 6:
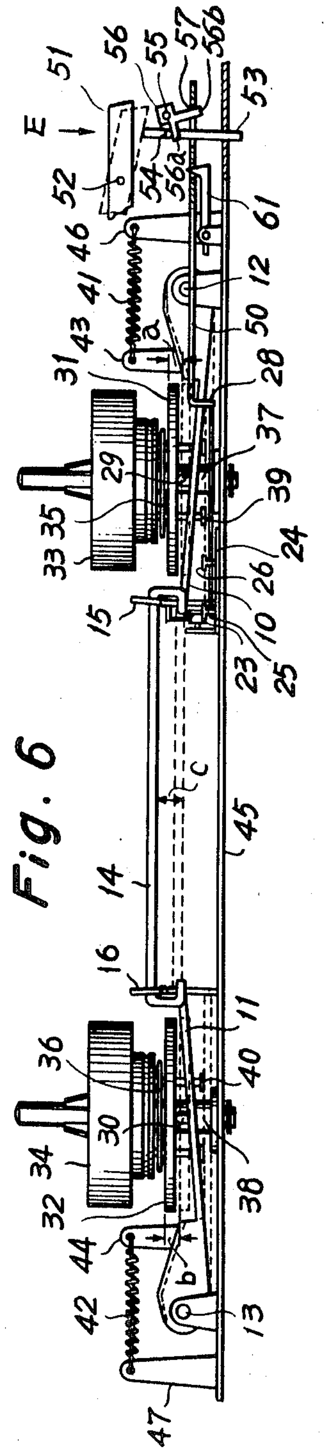
FIG. 6 is a side view of the device of FIG. 5.

FIGS. 5 and 6 are respectively plan and side views of the second embodiment of the device according to this invention, in which, the same numerals denote the corresponding members of the above first embodiment in FIGS. 1 to 3. In the figures, one end of the string 21 is fixed at the point 28 on the foremost end of a cam lever 50 for the fast forwarding of tape. Button 51 for fast forwarding of tape can move upwardly and downwardly about a shaft 52. By downward depression of the button 51, a push lever 53 engaging with the button 51 is depressed by a lower portion of the button 51 and moves downwards. By downward movement of the lever 53, a pin 54 provided on the lever 53 depresses an arm portion 56$a$ of an arm 56 turning about a shaft 55 and turns the arm 56 in a counterclockwise direction. Other arm portion 56$b$ in company with the movement of the arm 56 presses against a hole end 57 of the lever 50 which in turn horizontally slides in the direction of arrow A by the displacement $d$. Accordingly, the string 21 in suspension between the point 23 and the pin 25 moves in the direction of arrow B in a distance of $(f/e)xd$, thus the amount of displacement $c$ of the opposite free end portions 15 and 16 of the arms 10 and 11 being $c=(f/e)xd$, while the pivots 29 and 30 move downwardly in the amount of $(h/g)xc$. In the meantime, the lever 50 is secured in a position of displacement in the direction of arrow A by a locking member 61. Release of the locking member 61 from locking engagement may be made by a solenoid associated with said locking member.

There is provided a cam lever 58 for playing operation in parallel with the cam lever 50 for fast forwarding of tape. By depression of a button 59, the lever 58 slides by a lever mechanism which is similar to that which the lever 50 is actuated by the button 51 and operates the reproduction mechanism in the magnetic recording and reproducing apparatus. The levers 50 and 58 are carried in support by six units of rollers 60 each unit of which can slide the levers transversely in parallel with each other.

Thus, when the take-up disks 31 and 32 are in the downward position, the button 51 is in a depressed state and the fast forwarding of tape is realized but when the disks 31 and 32 are in the upward position the button 51 is not depressed or otherwise the button 59 for playing operation is depressed for realizing a normal recording and reproducing of tape.

The apparatus as described with reference to the accompanying drawings is of only an embodiment of the present invention and may be modified in various ways without departing from the scope of the invention as defined in the appended claims.

What I claim is:

1. An operation changing device for magnetic recording and reproducing apparatus comprising a plurality of arms turnable upwardly and downwardly, tension springs for imparting a force respectively turning said arms, movable members respectively carried by supports on said arms and movable upwardly and downwardly, a connecting rod connected to free end portions in opposite alignment of each arm to turn said arms simultaneously upwardly or downwardly, a string member having one end secured to any one arm of said arms and movable in the upward and downward directions permitting said arms to turn against a rotary force of said tension springs, and a direction changing means to change a movement in a vertical direction of said string member to a movement in a horizontal direction, said movable members being moved upwardly and downwardly following the upward and downward rotation of said rotary arm corresponding to the movement of said string member in the horizontal direction.

2. An operation changing device for magnetic recording and reproducing apparatus as claimed in claim 1 wherein said plurality of arms are two rotary arms respectively provided with free end portions in opposite alignment and said movable members are take-up reel disks supported at the lower surfaces by pivots on said arms.

3. An operation changing device for magnetic recording and reproducing apparatus as claimed in claim 2 which includes rotatable reel drums for mounting tape reels, said reel drums being respectively engaged with said reel disks through compression springs without moving in the upward and downward directions.

4. An operation changing device for magnetic recording and reproducing apparatus as claimed in claim 1 wherein said string member being a flexible thready string and said direction changing means having a roller, said string being wound on said roller and changeable in the direction of displacement.

5. An operation changing device for magnetic recording and reproducing apparatus as claimed in claim 1 wherein said connecting rod is connected between said rotary free ends of arms to maintain said each movable member at a position of the same level to impart the same amount of displacement to each arm during rotary movement of said arm.

6. An operation changing device for magnetic recording and reproducing apparatus as claimed in claim 1 which includes a rotatable lever having said string member disposed in horizontal by said direction changing means, said string member being respectively secured at two points in varied distance from the center of rotation, said rotatable lever being adapted to change the amount of displacement of the string member in stroke according to the ratio of distance of said two points from said center.

7. An operation changing device for magnetic recording and reproducing apparatus as claimed in claim 1 which includes a lever to which the other end of said string member is secured, a push button, and moving means for horizontally moving said lever in response to the depression of said push button.

8. An operation changing device for magnetic recording and reproducing apparatus as claimed in claim 7 which includes locking means for locking said lever in a moved position in response to the operation of said moving means.

References Cited

UNITED STATES PATENTS

| | | | |
|---|---|---|---|
| 2,664,251 | 12/1953 | Berlant | 242—202 |
| 2,745,604 | 5/1956 | Masterson | 242—189 |
| 2,979,277 | 4/1961 | Page et al. | 242—201 |

LEONARD D. CHRISTIAN, Primary Examiner

U.S. Cl. X.R.

242—206